US011848842B2

(12) United States Patent
Colenbrander

(10) Patent No.: US 11,848,842 B2
(45) Date of Patent: Dec. 19, 2023

(54) NETWORK STORAGE GAME ALLOCATION BASED ON ARTIFICIAL INTELLIGENCE

(71) Applicant: Sony Interactive Entertainment Inc., Tokyo (JP)

(72) Inventor: Roelof Roderick Colenbrander, Costa Mesa, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/545,313

(22) Filed: Dec. 8, 2021

(65) Prior Publication Data

US 2023/0179498 A1    Jun. 8, 2023

(51) Int. Cl.
*H04L 43/0817* (2022.01)
*A63F 13/355* (2014.01)
*H04L 43/04* (2022.01)

(52) U.S. Cl.
CPC ........ *H04L 43/0817* (2013.01); *A63F 13/355* (2014.09); *H04L 43/04* (2013.01); *A63F 2300/538* (2013.01)

(58) Field of Classification Search
None
See application file for complete search history.

(56) References Cited

U.S. PATENT DOCUMENTS

| 2015/0141152 | A1* | 5/2015 | Justice ................... A63F 13/73 463/42 |
| 2020/0171382 | A1* | 6/2020 | Agoston ............... A63F 13/355 |
| 2020/0206636 | A1 | 7/2020 | Schultz et al. |
| 2022/0062772 | A1* | 3/2022 | Holmdahl ............... A63F 13/77 |
| 2022/0203243 | A1* | 6/2022 | Ng ........................ A63F 13/497 |

OTHER PUBLICATIONS

Internatioinal Search Report PCT/US2022/050956, dated Feb. 23, 2023, Total 14 pages.

* cited by examiner

*Primary Examiner* — Anh Nguyen
(74) *Attorney, Agent, or Firm* — PENILLA IP, APC

(57) ABSTRACT

A method for game allocation in a game cloud system. The method including tracking state of a plurality of compute nodes of a data center, wherein the plurality of compute nodes is distributed across a plurality of rack assemblies. The method including tracking a plurality of popularity valuations of a plurality of video games. The method including determining a distribution of one or more video games from the plurality of video games across the plurality of rack assemblies based on the plurality of popularity valuations of the plurality of video games. The method including storing the one or more video games from the plurality of video games across the plurality of rack assemblies based on the distribution of the one or more video game that is determined.

17 Claims, 7 Drawing Sheets

NETWORK STORAGE GAME ALLOCATION BASED ON ARTIFICIAL INTELLIGENCE

TECHNICAL FIELD

The present disclosure is related to allocation of video games across a data center based on trends highlighting demand and/or popularity of the video games, and using artificial intelligence to identify the trends.

BACKGROUND OF THE DISCLOSURE

In recent years there has been a continual push for online services that allow for online or cloud gaming in a streaming format between a cloud gaming server and a client connected through a network. The streaming format has increasingly become more popular because of the availability of game titles on demand, the ability to execute more complex games, the ability to network between players for multi-player gaming, sharing of assets between players, sharing of instant experiences between players and/or spectators, allowing friends to watch a friend play a video game, having a friend join the on-going game play of a friend, and the like.

Data centers may be configured with multiple computing resources for supporting online or cloud gaming. For example, each of the computing resources can be configured to execute video games for game plays of gaming applications that can then be streamed to users. Demand for the computing resources may fluctuate depending on one or more parameters, including demand for a particular video game, the time period for the demand, geographic region of the demand, types of gaming being pursued, etc.

Data centers may be configured with storage for making video games accessible for execution on computing resources to meet user demand for video gaming. The storage is typically loaded with video games from a catalogue of videos games supported by the data center. However, each new generation of video games require more and more storage as video games provide improved graphics and more detailed gaming environments. Also, video games require faster and faster storage. Because each individual unit of storage is limited in size due to storage costs, it may be impractical to store the entire catalogue of video games in each individual unit of storage. For example, each unit of storage may be able to store about 10 percent of a catalogue of video games, and probably will be even less as the number of video games in a catalogue increases over time. This may place increased strain on the storage in terms of managing the storage of video games to meet user demand especially because the catalogue of video games is large and ever increasing.

It is in this context that embodiments of the disclosure arise.

SUMMARY

Embodiments of the present disclosure relate to efficient allocation of video games throughout data centers of a game cloud system or game cloud system by monitoring video game usage, system state of compute nodes in the game cloud system, predicting future video game usage based on historical patterns of use, and using artificial intelligence to analyze data captured from the game cloud system and network data (e.g., scraping data from social media, websites, various forms of media, etc.) to spot and/or predict trends in popularity on existing or new video games for use.

Embodiments of the present disclosure disclose a method for game allocation in a game cloud system. The method including tracking state of a plurality of compute nodes of a data center, wherein the plurality of compute nodes is distributed across a plurality of rack assemblies. The method including tracking a plurality of popularity valuations of a plurality of video games. The method including determining a distribution of one or more video games from the plurality of video games across the plurality of rack assemblies based on the plurality of popularity valuations of the plurality of video games. The method including storing the one or more video games from the plurality of video games across the plurality of rack assemblies based on the distribution of the one or more video game that is determined.

Other embodiments of the present disclosure disclose a non-transitory computer-readable medium storing a computer program for performing a method. The non-transitory computer-readable medium including program instructions for tracking state of a plurality of compute nodes of a data center, wherein the plurality of compute nodes is distributed across a plurality of rack assemblies. The non-transitory computer-readable medium including program instructions for tracking a plurality of popularity valuations of a plurality of video games. The non-transitory computer-readable medium including program instructions for determining a distribution of one or more video games from the plurality of video games across the plurality of rack assemblies based on the plurality of popularity valuations of the plurality of video games. The non-transitory computer-readable medium including program instructions for storing the one or more video games from the plurality of video games across the plurality of rack assemblies based on the distribution of the one or more video game that is determined.

Still other embodiments of the present disclosure disclose a computer system including a processor and memory coupled to the processor and having stored therein instructions that, if executed by the computer system, cause the computer system to execute a method. The method including tracking state of a plurality of compute nodes of a data center, wherein the plurality of compute nodes is distributed across a plurality of rack assemblies. The method including tracking a plurality of popularity valuations of a plurality of video games. The method including determining a distribution of one or more video games from the plurality of video games across the plurality of rack assemblies based on the plurality of popularity valuations of the plurality of video games. The method including storing the one or more video games from the plurality of video games across the plurality of rack assemblies based on the distribution of the one or more video game that is determined.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1:
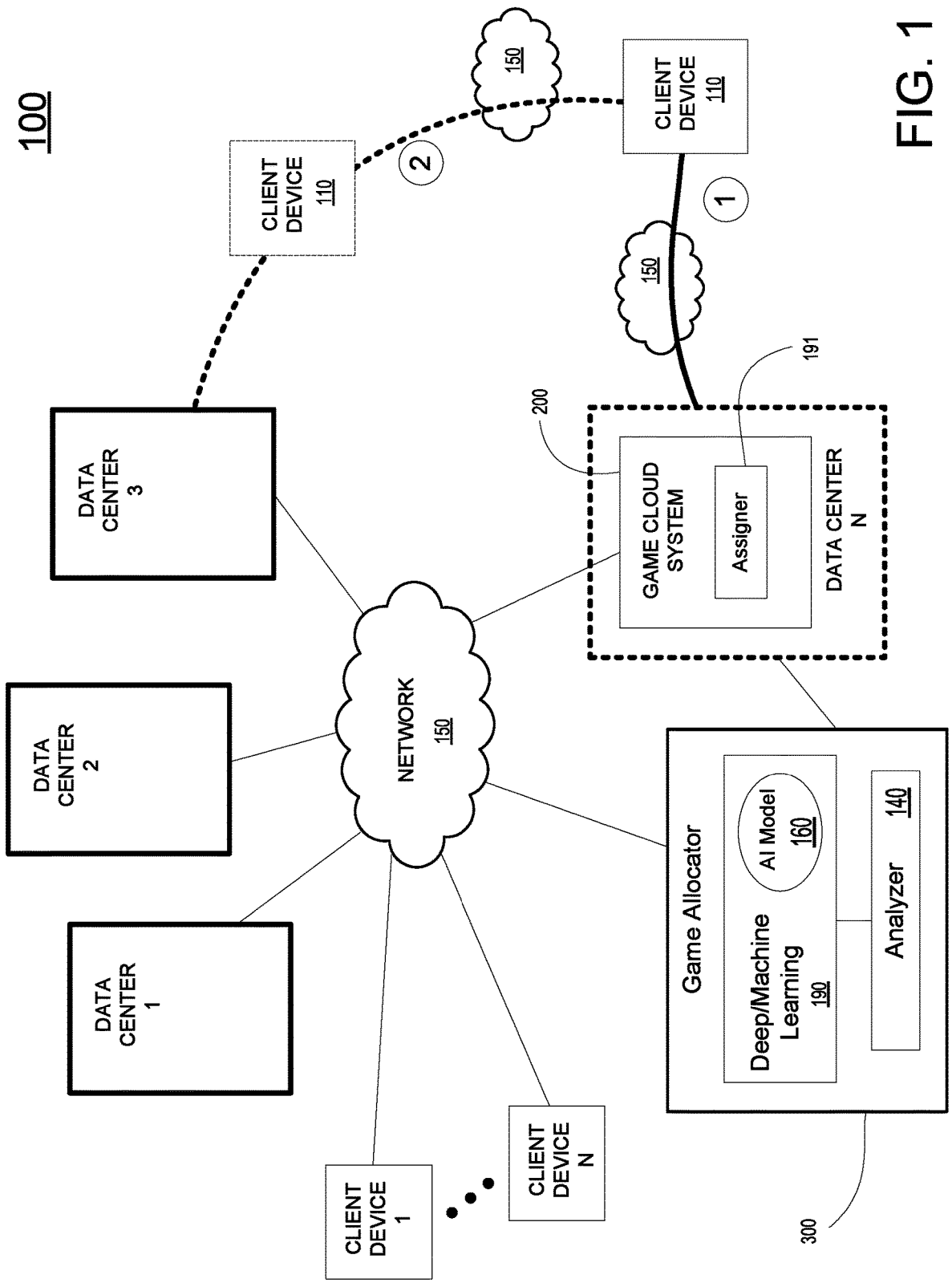
FIG. 1 is a diagram of a system for providing gaming over a network between one or more compute nodes located at one or more data centers, and is further configured for efficient allocation of video games throughout data centers to meet current and future demands of user to play current and new video games, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, as time passes, the sizes of video games and game catalogues increase. Further, the video games require faster and faster storage. However because having faster storage in a data center is cost sensitive (i.e., expensive), in order to meet the requirement for fast storage not every video game in a game catalogue may be stored on every network storage server within a data center. Embodiments of the present disclosure provide for efficient allocation of video games throughout data centers (e.g., on network storage) of a game cloud system by monitoring video game usage, system state of compute nodes in the game cloud system, predicting future video game usage based on historical patterns of use, and using artificial intelligence to analyze data captured from the game cloud system and network data (e.g., scraping data from social media, websites, various forms of media, etc.) to spot and/or predict trends in popularity on existing or new video games for use. In particular, a cloud management controller is configured to keep an inventory of all available cloud gaming servers, monitor the cloud gaming servers (e.g., compute nodes), and track state (e.g., in use or not) of the cloud gaming servers. In addition, the cloud management controller is configured to monitor and track the video games that are stored on one or more network storage servers and/or cloud gaming servers (e.g., compute nodes) in each rack assembly. Furthermore, in embodiments an artificial intelligence (AI) layer within the cloud management controller is configured to track the popularity of video game titles, and is further configured to schedule optimal distribution of video games across the rack assemblies of one or more data centers of a game cloud system. For example, in order to meet current and predicted user demand for video game titles, each of the rack assemblies may be loaded with the most popular video game title, and a less popular video game title may be loaded onto maybe one rack assembly, and other video game titles may be loaded onto a select number of rack assemblies, and still other video game titles may remain in remote storage with a corresponding video game title only loaded onto a rack assembly upon a user demanding that video game title. In other embodiments, as the AI layer tracks track popularities of video game titles, the AI layer is further configured to ensure that if an obscure video game title suddenly goes viral (i.e., becomes increasingly popular in a very short period of time), additional rack assemblies in the data center are loaded with that video game title in order to meet a huge surge in demand by users to play that video game title. In some embodiments, measurement of a state of a video game as it is going viral can be based on cloud gaming sessions, but also can be measured by external indicators, such as social media site activity (e.g., Twitter, Facebook, etc.), digital or non-digital news articles, communication platforms (e.g., texting, voice, etc.), or past experience (e.g. a new video game within the same franchise is anticipated to do just as well if not better than the last released video game within the franchise, etc.), digital store sales (e.g., video game sales, etc.) over one or more platforms (e.g., gaming networks, online stores, e-commerce platforms, etc.), other e-commerce data (e.g., consumer visits, etc.), etc.

With the above general understanding of the various embodiments, example details of the embodiments will now be described with reference to the various drawings.

Throughout the specification, the reference to "application" or "game" or "video game" or "gaming application" or "game title" is meant to represent any type of interactive application that is directed through execution of input commands. For illustration purposes only, an interactive application includes applications for gaming, word processing, video processing, video game processing, etc. Further, the terms introduced above are interchangeable.

FIG. 1 is a diagram of a system 100 for providing gaming over a network 150 between one or more compute nodes located at one or more data centers, in accordance with one embodiment of the present disclosure. The system is configured to provide gaming over a network between one or more cloud gaming servers, and more specifically is configured efficiently allocate video games throughout one or more data centers to meet current and future demands of user to play current and new video games, such that video games of a gaming catalogue are readily and immediately accessed by users without waiting for a game cloud system to catch up to demand (e.g., waiting for a video game to load onto the network storage and compute node). Cloud gaming includes the execution of a video game at the server to generate game rendered video frames, which are then sent to a client for display.

It is also understood that cloud gaming and/or other services may be performed using physical machines (e.g., central processing units—CPUs—and graphics processing units—GPU), or virtual machines, or a combination of both, in various embodiments (e.g. in a cloud gaming environment or within a stand-alone system). For example, virtual machines (e.g. instances) may be created using a hypervisor of a host hardware (e.g. located at a data center) utilizing one or more components of a hardware layer, such as multiple CPUs, memory modules, GPUs, network interfaces, communication components, etc. These physical resources may be arranged in racks, such as racks of CPUs, racks of GPUs, racks of memory, etc., wherein the physical resources in the racks may be accessed using top of rack switches facilitating a fabric for assembling and accessing of components used for an instance (e.g. when building the virtualized components of the instance). Generally, a hypervisor can present multiple guest operating systems of multiple instances that are configured with virtual resources. That is, each of the operating systems may be configured with a corresponding set of virtualized resources supported by one or more hardware resources (e.g. located at a corresponding data center). For instance, each operating system may be supported with a virtual CPU, multiple virtual GPUs, virtual memory, virtualized communication components, etc. In addition, a configuration of an instance that may be transferred from one data center to another data center to reduce latency. Instant utilization defined for the user or game can be utilized when saving a user's gaming session. The instant utilization can include any number of configurations described herein to optimize the fast rendering of video frames for a gaming session. In one embodiment, the instant utilization defined for the game or the user can be transferred between data centers as a configurable setting. The ability to transfer the instant utilization setting enables for efficient migration of game play from data center to data center in case the user connects to play games from different geo locations.

System 100 includes a game cloud system 200 as implemented through one or more data centers (e.g., data centers 1 through N). As shown an instance of game cloud system 200 could be located in data center N that provides management functionality, wherein the management functionality of the game cloud system 200 may be distributed through multiple instances of the game cloud system 200 at each of the data centers. In some implementations, the game cloud system management functionality may be located outside of any of the data centers. For example, management functionality of the game cloud system may be performed by a cloud management controller, as will be further described in FIGS. 2A-2B.

That game cloud system 200 includes an assigner 191 that is configured to assign each of the client devices (e.g., 1-N) to corresponding resources in corresponding data centers. In particular, when client device 110 logs into the game cloud system 200, the client device 110 may be connected with an instance of a game cloud system 109 at data center N, wherein data center N may be geographically closest to client device 110. The assigner 191 is able to perform diagnostic testing to determine available transmit and receive bandwidth to the client device 110. Also, diagnostic testing includes determining latency and/or round trip time between a corresponding data center and a client device 110. Based on the testing, the assigner 191 is able to assign resources to client device 110 with great specificity. For example, the assigner 191 is able to assign a particular data center to the client device 110. In addition, the assigner 191 is able to assign to the client device 110 a particular compute node, of a particular compute sled, of a particular streaming array, of a particular rack assembly. Assignment may be performed based on knowledge of assets (e.g., games) that are available at the compute nodes. Previously, the client device is assigned general to a data center, without further assignment to rack assemblies. In this manner, the assigner 191 is able to assign a client device that is requesting execution of a particular gaming application that is compute intensive to a compute node that may not be running compute intensive applications. In addition, load management of assigning of compute intensive gaming applications as requested by clients may be performed at the assigner 191. For example, the same compute intensive gaming application that is being requested over a short period of time, may be spread across different compute nodes, of different compute sleds in one rack assembly or different rack assemblies to reduce load on a particular compute node, compute sled, and/or rack assembly.

In some embodiments, the assignment may be performed based on machine learning. In particular, resource demand may be predicted for a particular data center, and its corresponding resources. For example, if it can be predicted that a data center will soon be handling many clients running compute intensive gaming applications, then the assigner 191 may assign client device 110 with that knowledge, and assign resources that may not be currently utilizing all of its resource capabilities. In another case, assigner 191 may switch client device 110 from the game cloud system 200 in data center N to resources available in data center 3, in anticipation of increased loading at data center N. In addition, future clients may be assigned to resources in a distributed fashion, such that the load and demand for resources may be distributed throughout the game cloud system, across multiple data centers, across multiple rack assemblies, across multiple compute sleds, and/or across multiple compute nodes. For example, client device 110 may be assigned resources from both game cloud systems on data center N (e.g., over path 1) and data center 3 (e.g., over path 2).

Once the client device 110 is assigned to a particular compute node, of a corresponding compute sled, of a corresponding streaming array, the client device 110 connects to the corresponding data center through the network. That is, the client device 110 may be communicating with a different data center, such as data center 3, than the one performing assignment.

In addition, game cloud system 200 includes a game allocator 300 that is configured to allocate and/or distribute video games of a gaming catalogue throughout data centers of the game cloud system to support current and predicted (e.g., future) demand for video games and the computing resources required to execute gaming sessions of those video games. For example, the game allocator 300 may be implemented within a cloud management controller that is configured to manage resources within the game cloud system. In particular, the game allocator 300 may be configured to monitor video game usage and system state of compute nodes and network storage in order to determine current and future demand for video games and the computing resources required to meet that demand. In some embodiments, artificial intelligence (AI) may be applied to identify trends in the popularity of video games and the demand for computing resources by users because of the popularity of those video games. For example, a deep learning and/or machine learning engine 190 may be configured to implement an AI model 160 that is configured to classify and/or identify trends (e.g., current and future) in popularity of one or more video game titles based on input data including metrics captured within the game cloud system (e.g., gaming sessions for one or more video games), and other data that is captured from network sources (e.g., social media platforms, web sites, news sites, etc.), traditional information sources (e.g., media outlets, etc.), other digital platforms (e.g., communications media (e.g., texting, messaging, etc.), still other non-digital platforms, online stores, etc. In some embodiments, trends in the popularity of video games and the demand for computing resources predicted based on the trends may be determined through rules, such as without the application of artificial intelligence.

Further, the game allocator 300 is configured to analyze results from the AI model 160 at the analyzer 140, including analyzing the classified and/or identified trends of one or more video games (e.g., indicating popularity of those video games). The analyzer 140 is configured to determine an allocation and/or distribution of video games throughout the one or more data centers of the game cloud system based on the classified and/or identified trends. In still other embodiments, the allocation and/or distribution of video games throughout one or more data centers of the game cloud system is determined through rules that are applied to trends determined through artificial intelligence or also through other rules.

For example, a game cloud system may have multiple data centers located throughout the world. One or more data centers may be arranged in groups, wherein each group may provide services to a particular region of the world. In embodiments, analysis of data (e.g., identifying trends of one or more video games) from a first group providing services to a first region may be useful for a second group providing services to a second region, wherein the analysis may include the allocation and/or distribution of video games in throughout data center(s) of the second group. That is, the AI allocation and prediction layer may be shared across the different groups of data centers of a game cloud system. As an illustration, data analysis from a first group may indicate that a video game is going viral in the first region (e.g., Europe), while simultaneously the second region (e.g., North America including the United States of America) is relatively inactive as persons in the second region are generally asleep. Results from the data analysis associated with trends for the video game in the first group associated with the first region may be applied to the second group associated with the second region, especially if the video game is also popular in the second region (e.g., North America). In particular, the video game may be pre-emptively installed to rack assemblies and/or compute nodes of the second group associated with the second region in anticipation of the video game also going viral in North America.

System 100 provides gaming via a game cloud system 200, wherein the game is being executed remote from client device (e.g. thin client) of a corresponding user that is playing the game, in accordance with one embodiment of the present disclosure. System 100 may provide gaming control to one or more users playing one or more games through the cloud game network or game cloud system 200 via network 150 in either single-player or multi-player modes. In some embodiments, the cloud game network or game cloud system 200 may include a plurality of virtual machines (VMs) running on a hypervisor of a host machine, with one or more virtual machines configured to execute a game processor module utilizing the hardware resources available to the hypervisor of the host. Network 150 may include one or more communication technologies. In some embodiments, network 150 may include 5$^{th}$ Generation (5G) network technology having advanced wireless communication systems.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

As shown, the system 100 including game cloud system 200 can provide access to a plurality of gaming applications. In particular, each of the client devices may be requesting access to different gaming applications from the cloud game network. For example, the game cloud system 200 may provide one or more game servers that may be configured as one or more virtual machines executing on one or more hosts to execute a corresponding gaming application. For example, a game server may manage a virtual machine supporting a game processor that instantiates an instance of a gaming application for a user. As such, a plurality of game processors of one or more game servers associated with a plurality of virtual machines is configured to execute multiple instances of one or more gaming applications associated with gameplays of a plurality of users. In that manner, back-end server support provides streaming of media (e.g. video, audio, etc.) of gameplays of a plurality of gaming applications to a plurality of corresponding users. That is, a game server of the game cloud system 200 is configured to stream data (e.g. rendered images and/or frames of a corresponding gameplay) back to a corresponding client device through network 150. In that manner, a computationally complex gaming application may be executing at the back-end server in response to controller inputs received and forwarded by client device. Each server is able to render images and/or frames that are then encoded (e.g. compressed) and streamed to the corresponding client device for display.

In embodiments, each virtual machine defines a resource environment which can support an operating system, upon which a gaming application can be run. In one embodiment, a virtual machine can be configured to emulate the hardware resource environment of a gaming console, with an operating system associated with the gaming console being run on the virtual machine to support the running of game titles which were developed for that gaming console. In another embodiment, the operating system can be configured to emulate a native operating system environment of a gaming console, though the underlying virtual machine may or may not be configured to emulate the hardware of the gaming console. In another embodiment, an emulator application is run on top of the operating system of a virtual machine, the emulator being configured to emulate the native operating system environment of a gaming console so as to support gaming applications and/or video games designed for that gaming console. It should be appreciated that a variety of current and legacy gaming consoles can be emulated in a cloud-based gaming system. In this manner, a user can access game titles from different gaming consoles via the cloud-gaming system.

In one embodiment, cloud game network or game cloud system 200 is a distributed game server system and/or architecture. In particular, a distributed game engine executing game logic is configured as a corresponding instance of a corresponding gaming application. In general, the distributed game engine takes each of the functions of a game engine and distributes those functions for execution by a multitude of processing entities. Individual functions can be further distributed across one or more processing entities. The processing entities may be configured in different configurations, including physical hardware, and/or as virtual components or virtual machines, and/or as virtual containers, wherein a container is different from a virtual machine as it virtualizes an instance of the gaming application running on a virtualized operating system. The processing entities may utilize and/or rely on servers and their underlying hardware on one or more servers (compute nodes) of the cloud game network or game cloud system 200, wherein the servers may be located on one or more racks. The coordination, assignment, and management of the execution of those functions to the various processing entities are performed by a distribution synchronization layer. In that manner, execution of those functions is controlled by the distribution synchronization layer to enable generation of media (e.g. video frames, audio, etc.) for the gaming application in response to controller input by a player. The distribution synchronization layer is able to efficiently execute (e.g. through load balancing) those functions across the distributed processing entities, such that critical game engine components/functions are distributed and reassembled for more efficient processing.

Figure 2A:
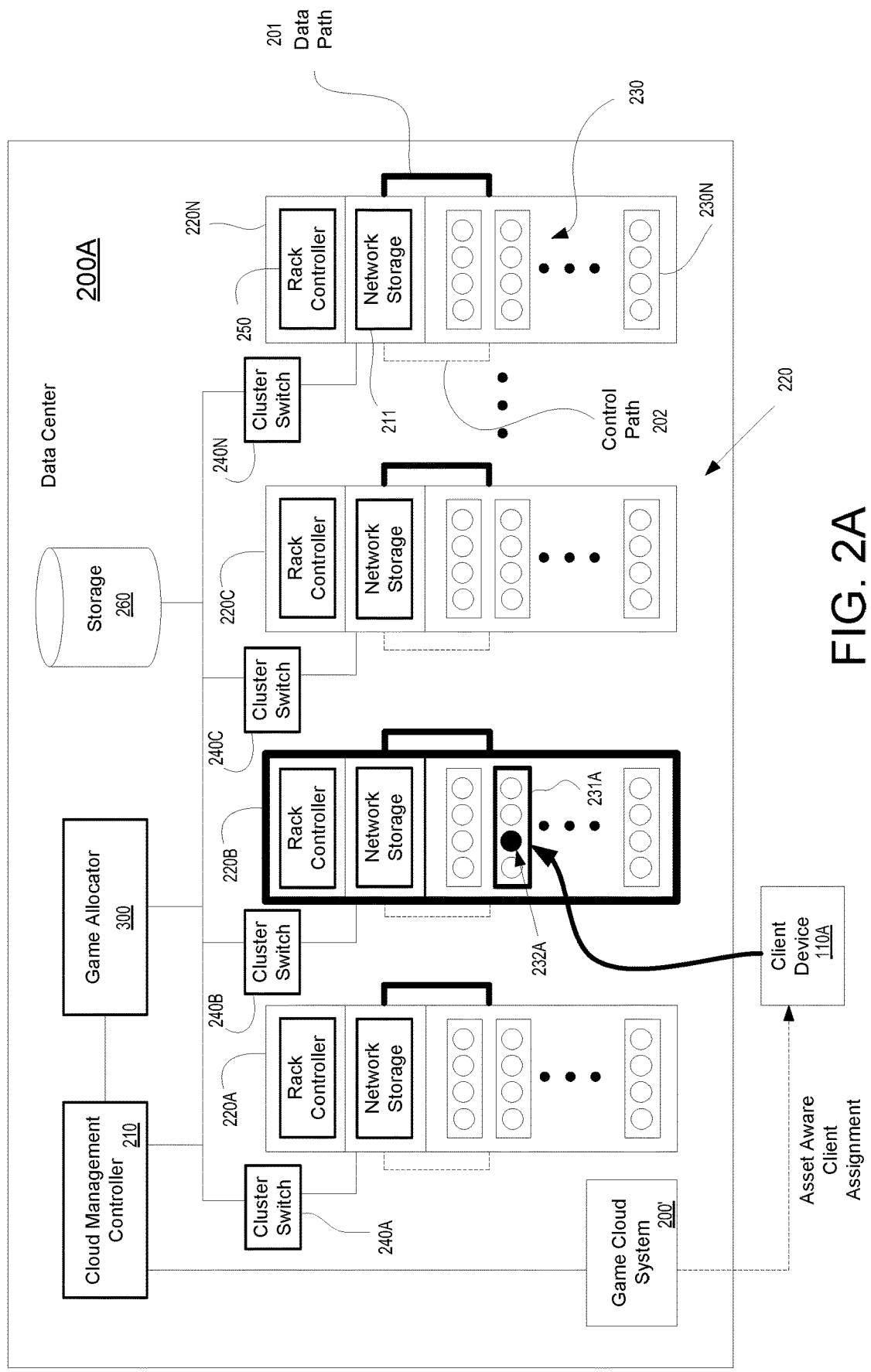
FIG. 2A is a diagram of a plurality of rack assemblies including a plurality of compute nodes at a representative data center of a game cloud system, in accordance with one embodiment of the present disclosure.

FIG. 2A is a diagram of a plurality of rack assemblies 210 including a plurality of compute nodes at a representative data center 200A of a game cloud system, in accordance with one embodiment of the present disclosure. For example, multiple data centers may be distributed throughout the world, such as in North America, Europe and Japan. FIG. 2A is provided to illustrate an exemplary configuration of a corresponding rack assembly including a network storage that is accessible by compute nodes located on that rack assembly.

The data center 200 includes a plurality of rack assemblies 220 (e.g., rack assemblies 220A through 220N). Each of the rack assemblies includes corresponding network storage and a plurality of compute sleds. For example, representative rack assembly 220N includes network storage 211 and a plurality of compute sleds 230 (e.g., sleds 230A through 230N), and a rack controller 250 configured for internal and external network configuration of components the rack assembly 220N. Other rack assemblies may be similarly configured with or without modification. In particular, each of the compute sleds includes one or more compute nodes providing hardware resources (e.g., processors, CPUs, GPUs, etc.). For example, compute sled 230N in the plurality of compute sleds 230 of rack assembly 220N is shown to include four compute nodes, though it is understood that the rack assembly may include one or more compute nodes. Each rack assembly is coupled to a cluster switch that is configured to provide communication with a management server that is configured for management of the corresponding data center. For example, rack assembly 220N is coupled to cluster switch 240N. The cluster switch also provides communication to external communication networks (e.g., internet, etc.).

In particular, a cluster fabric (e.g., cluster switches, etc.) provides communications between rack assemblies in one or more clusters, distributed storage 270, and a communication network. In addition, the cluster fabric/switches also provide data center supports services, such as management, logging, monitoring, event generation, tracking, etc. Cluster fabric/switches may provide communication to an external communication network via a router system and a communication network (e.g., internet). Also, cluster fabric/switches provide communication to storage 270. A cluster of rack assemblies at a representative data center of a game cloud system may include one or more rack assemblies by design choice. In one embodiment, a cluster includes fifty rack assemblies. In other embodiments, a cluster may include more than or less than fifty rack assemblies.

In one network configuration, each rack assembly provides high speed access to corresponding network storage, such as within a rack assembly. In one embodiment, this high speed access is provided over a PCIe fabric which provides direct access between a compute node and the corresponding network storage. In other embodiments, high speed access is provided over other network fabric topologies and/or networking protocols, including Ethernet, Infiniband, remote direct memory access (RDMA) over converged Ethernet (RoCE), etc. For example, in rack assembly 220N the high speed access is configured to provide a data path 201 between a particular compute node of a corresponding compute sled to corresponding network storage (e.g., storage 211). In particular, the PCIe fabric is capable of providing greater than 4 Gigabyte per second (GB/s) network storage bandwidth (e.g., access) per compute node (e.g., of a rack assembly) at non-volatile memory express (NVMe) latencies. Also, a control path 202 is configured for communicating control and/or management information between the network storage 210 and each of the compute nodes.

The streaming rack assemblies are centered around compute nodes, which run gaming applications, video games and/or stream the audio/video of a game session to a one or more clients. Further, within each rack assembly, video game content may be stored on a storage server providing network storage. The network storage is equipped with a large amount of storage and high-speed networking to serve many compute nodes. In particular, a storage protocol (e.g., network file system, etc.) would be implemented over the network fabric topology used for accessing network storage. Data may be stored in network storage using file storage, block storage, or object storage techniques based, in part, on the underlying storage protocol being implemented. For example, a PCIe fabric storage protocol may access block storage data from network storage. The network storage may be configured for fast access, but may not be large enough to store a full catalogue of video game titles. As such, allocation of video games onto network storage is performed based on current and predicted further demand of video games. That is, video games are stored on network storage for a corresponding rack assembly in order to support demand for those video games by users of the game cloud system. As such, compute nodes within a rack assembly may be handling gaming sessions for video games, wherein the video games are stored on network storage for ready access and then subsequently loaded onto the compute nodes for execution. Depending on licensing agreements, a video game may be loaded onto network storage for a rack assembly once with subsequent copies loaded onto one or more compute nodes under a multi-user single copy license, or multiple instances of the video game may be loaded onto the network storage that can then be effectively transferred on a one-to-one basis to one or more compute nodes under a single-user single copy license.

The distributed storage 260 provides centralized storing of user data, game data, and game packages that is accessible by compute nodes of each of the clusters 255 of rack assemblies. Distributed storage 260 is scalable such that servers may be added or removed depending on demand, and wherein the storage 260 is able to redistribute and/or reconfigure itself. In addition, distributed storage is configured to provide load balancing, such that data is stored in small chunks across multiple storage servers. Management of the distributed storage can be performed through user interfaces. In particular, distributed storage 250 may be configured to store a full complement of video game titles (e.g., gaming applications) for a game cloud system 200 (e.g., approximately 200 terabytes [TB] of storage for storing the full catalogue of gaming applications). Distributed storage 260 may also be configured to store user and game data for the users of the game cloud system 200. User and game data may include user save data, suspend/resume data for corresponding gaming applications, download data, and others (e.g., imaging, photos, etc.). For purposes of illustration, each user may require approximately 50 gigabytes (GB) of storage for each user. In one embodiment, distributed storage 260 stores of suspend/resume information associated with corresponding game titles (e.g., 8 gigabytes per game title).

As shown, the cloud management controller 210 of the data center 200 communicates with the assigner 191 (shown in FIG. 1) to assign resources to client device 110. In particular, cloud management controller 210 may work with an instance of the game cloud system 200' and in conjunction with the initial instance of the game cloud system 200 (e.g., of FIG. 1) to assign resources to client device 110. In embodiments, the assignment is performed based on asset awareness, such as knowing what resources and bandwidth are required and that exist at the data center. As such, embodiments of the present disclosure are configured to assign client device 110A to a particular compute node 232A of a corresponding compute sled 231A of a corresponding rack assembly 220B, for illustration.

In addition, the cloud management controller 210 is configured to collect and analyze data (e.g., internal data associated with the game cloud system, and external data including network data, etc.) in order to identify trends in popularity of video games for purposes of allocating video games across rack assemblies (e.g., to network storage, compute nodes, etc.) of one or more data centers of a game cloud system in order to meet current and predicted (e.g., future) demand for playing those video games (e.g., in gaming sessions). In particular, the cloud management controller 210 is configured to track and manage an inventory of all available cloud gaming servers (e.g., compute nodes), monitor the cloud gaming servers, and track state (e.g., in use or not) of the cloud gaming servers. In addition, the cloud management controller is configured to monitor and track the video games that are stored on one or more network storage servers and/or compute nodes in each rack assembly. Further, the cloud management controller 210 may be configured to track gaming sessions implemented across the cloud gaming servers. In one embodiment, a game allocator 300 may be included within or be in communication with the cloud management controller 210 in order to perform the operations necessary for allocation of video games to network storage and/or compute nodes of rack assemblies of the one or more data centers of the game cloud system, as will be further described below in FIG. 3. In some embodiments, artificial intelligence is included within the game allocator 300 for performing the operations necessary for allocation of video games to network storage. In particular, an AI layer within the cloud management controller 210 and/or game allocator 300 is configured to track the popularity of video game titles, and is further configured to schedule optimal distribution of video games across the rack assemblies of one or more data centers of a game cloud system. That is, AI is used to determine a popularity of a video game, and determine a number of rack assemblies for storing the video game based on the determined popularity.

Figure 2B:
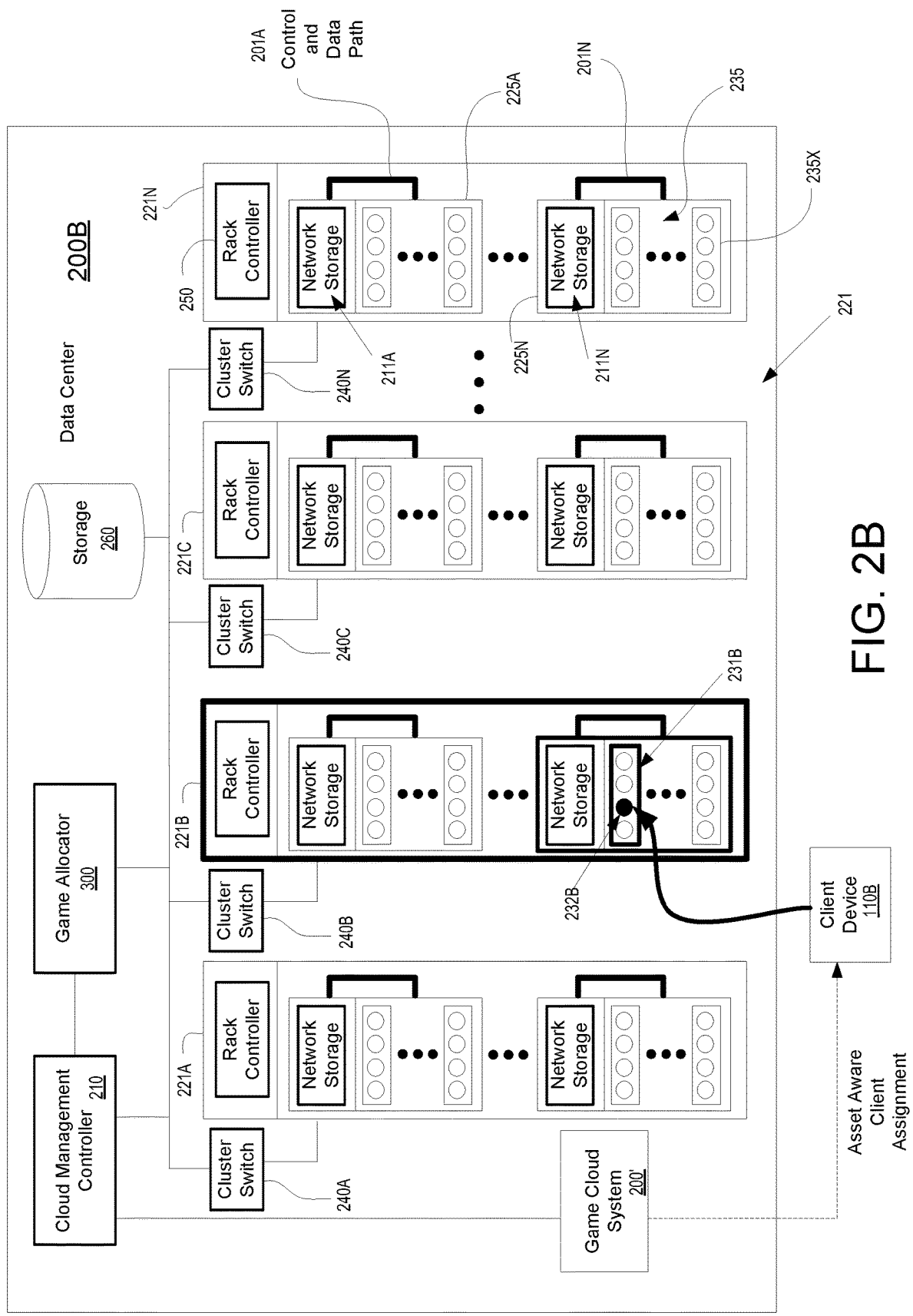
FIG. 2B is a diagram of a plurality of rack assemblies including a plurality of compute nodes at a representative data center of a game cloud system, wherein each network storage is accessible by a corresponding array of compute nodes, in accordance with one embodiment of the present disclosure.

FIG. 2B is a diagram of a plurality of rack assemblies 221 including a plurality of compute nodes at a representative data center 200B of a game cloud system, wherein each network storage is accessible by a corresponding array of compute nodes, in accordance with one embodiment of the present disclosure. Data center 200B is similar to data center 200A, wherein like numbered components have similar functionality. However, data center 200B has a different configuration of rack assemblies than the rack assemblies in data center 200A, such that network storage is accessed by compute nodes of a single streaming array, as will be described below.

The data center 200 includes a plurality of rack assemblies 221 (e.g., rack assemblies 221A through 221N). Each of the rack assemblies includes one or more streaming arrays, wherein each streaming array includes corresponding network storage and a plurality of compute sleds. For example, representative rack assembly 221N includes streaming arrays 225A through 225N. In one embodiment, rack assembly 221N includes two streaming arrays, wherein each streaming array includes network storage and a plurality of compute sleds. For example, streaming array 225N includes a plurality of compute sleds 235 accessing a network storage 211-N. In particular, each of the compute sleds includes one or more compute nodes providing hardware resources (e.g., processors, CPUs, GPUs, etc.). For example, compute sled 235X of streaming array 225N is shown to include four compute nodes, though it is understood that the rack assembly may include one or more compute nodes.

Each rack assembly is coupled to a cluster switch that is configured to provide communication with a cloud management controller 210 that is configured for management of the corresponding data center, as previously described. For example, rack assembly 221N is coupled to cluster switch 240N. The cluster switch also provides communication to other rack assemblies (e.g., via corresponding cluster switches, and to external communication networks (e.g., internet, etc.).

In one network configuration, each streaming array of a corresponding rack assembly provides high speed access to corresponding network storage, as previously described. This high speed access is provided over a PCIe fabric which provides direct access between a compute node and the corresponding network storage. Compute nodes may run gaming applications and stream the audio/video of a game session to one or more clients, wherein corresponding network storage (e.g., storage server) holds the gaming application, game data, and user data. For example, in streaming array 225A of rack assembly 221N the high speed access is configured to provide a data and control path 201A between a particular compute node of a corresponding compute sled to corresponding network storage (e.g., storage 211A). Also, path 201N is configured for communicating control and/or management information between the network storage 211N and each of the compute nodes in streaming array 225N.

Figure 3:
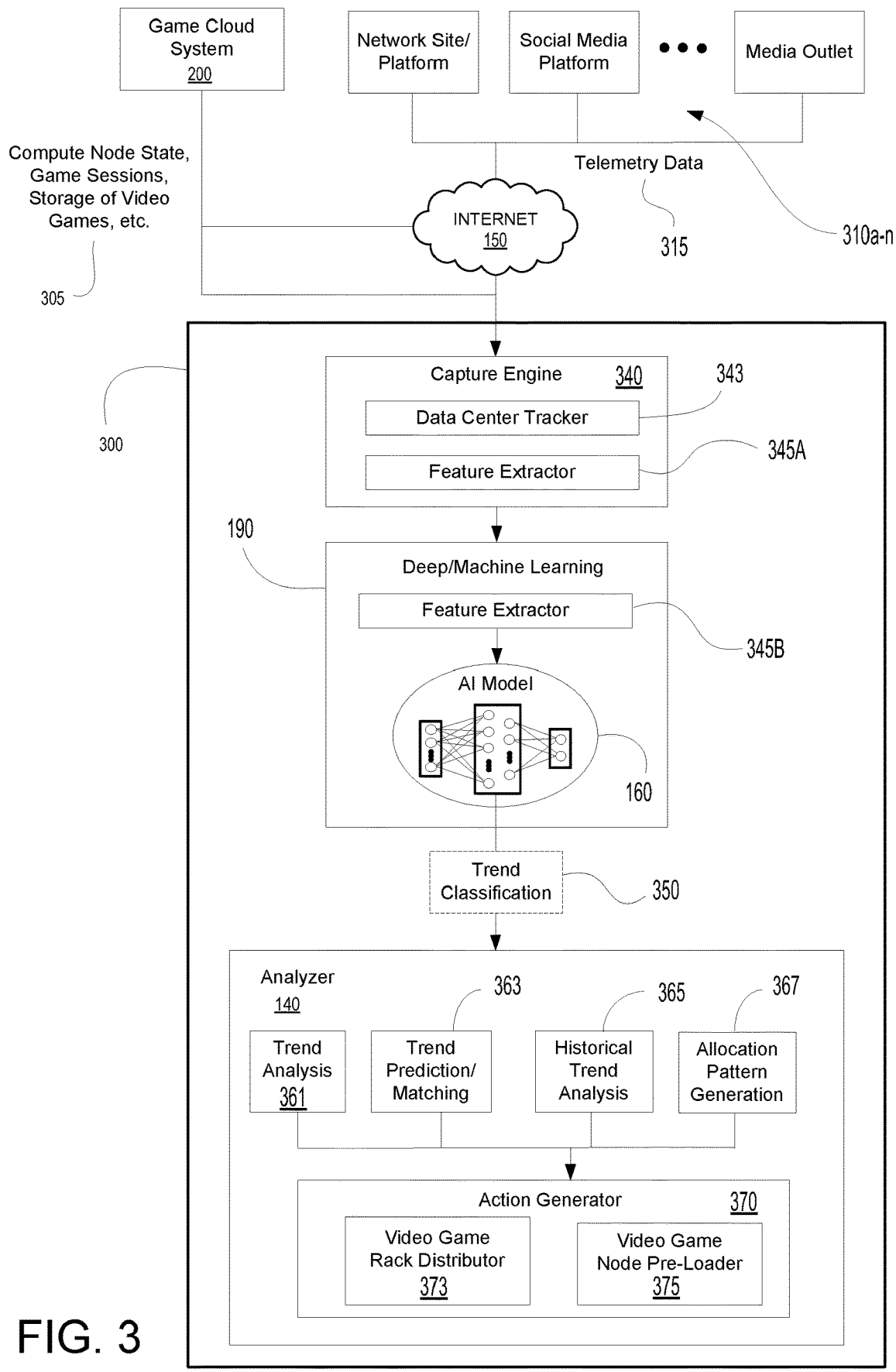
FIG. 3 is an illustration of a system configured to implement an artificial intelligence model configured for allocation of video games throughout a game cloud system to meet current and future demands of users to play current and new video games, in accordance with one embodiment of the present disclosure.
Figure 4:
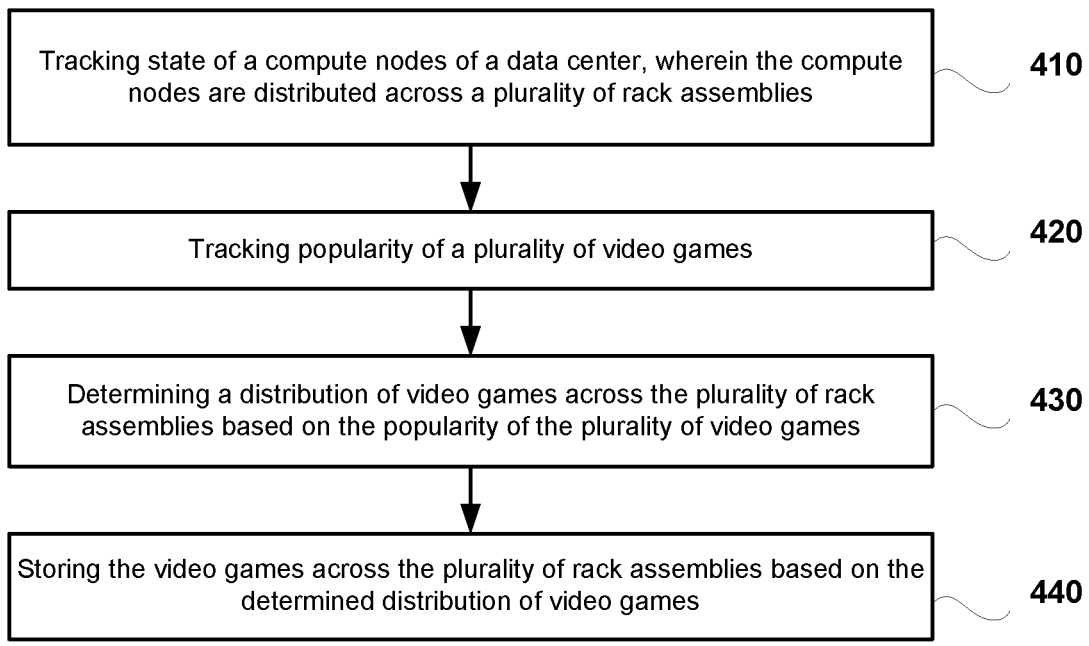
FIG. 4 is a flow diagram illustrating steps in a method for allocating video games throughout a game cloud system to meet current and future demands of users to play current and new video games, in accordance with one embodiment of the present disclosure.

With the detailed description of the various modules of the system 100, data centers 200A and 200B, and the game allocator 300 of FIGS. 1, 2A, 2B, and 3, flow diagram 400 of FIG. 4 discloses a method for allocating video games throughout a game cloud system to meet current and future demands of users to play current and new video games, in accordance with one embodiment of the present disclosure. In particular, flow diagram 400 may be implemented to provide for an appropriate allocation of video games throughout data centers (e.g., on network storage) of a game cloud system based on popularity of video games. For example, video game popularity may be determined by monitoring video game usage, system state of compute nodes in the game cloud system, predicting current future video game usage based on historical patterns of use, and using artificial intelligence to analyze data captured from the game cloud system and network data (e.g., scraping data from social media, websites, various forms of media, etc.) to spot and/or predict trends in popularity on existing or new video games. Flow diagram 400 may be implemented within a back-end server (e.g., within the game cloud system 200 in a cloud management controller 210 and/or game allocator 300 in combination with a deep and/or machine learning engine 190), previously described.

As previously described, cloud management controller 210 of data center 200B communicates with the assigner 191 to assign resources to client device 110 in support of game cloud system 200' and/or 200. In embodiments, the assignment is performed based on asset awareness, such as knowing what resources and bandwidth are required and that exist at the data center. As such, embodiments of the present disclosure are configured to assign client device 110C to a particular compute node 232B of a corresponding compute sled 231B of a corresponding streaming array of a rack assembly 221B, for illustration.

Also, the cloud management controller 210 and/or the game allocator 300 are configured to collect and analyze data (e.g., internal data associated with the game cloud system, and external data including network data, etc.) in order to identify trends in popularity of video games for purposes of allocating video games across rack assemblies (e.g., to network storage, compute nodes, etc.)) of one or more data centers of a game cloud system in order to meet current and predicted demand for playing those video games (e.g., in gaming sessions). In some embodiments, artificial intelligence is implemented for analyzing data in order to identify trends in popularity of video games for purposes of determining an appropriate allocation of video games to network storage of rack assemblies in one or more data centers of a game cloud system. In particular, an AI layer within the cloud management controller 210 and/or game allocator 300 is configured to track the popularity of video game titles, and is further configured to schedule optimal distribution of video games across the rack assemblies of one or more data centers of a game cloud system. That is, AI is used to determine a popularity of a video game, and determine a number of rack assemblies for storing the video game based on the determined popularity.

Figure 2C:
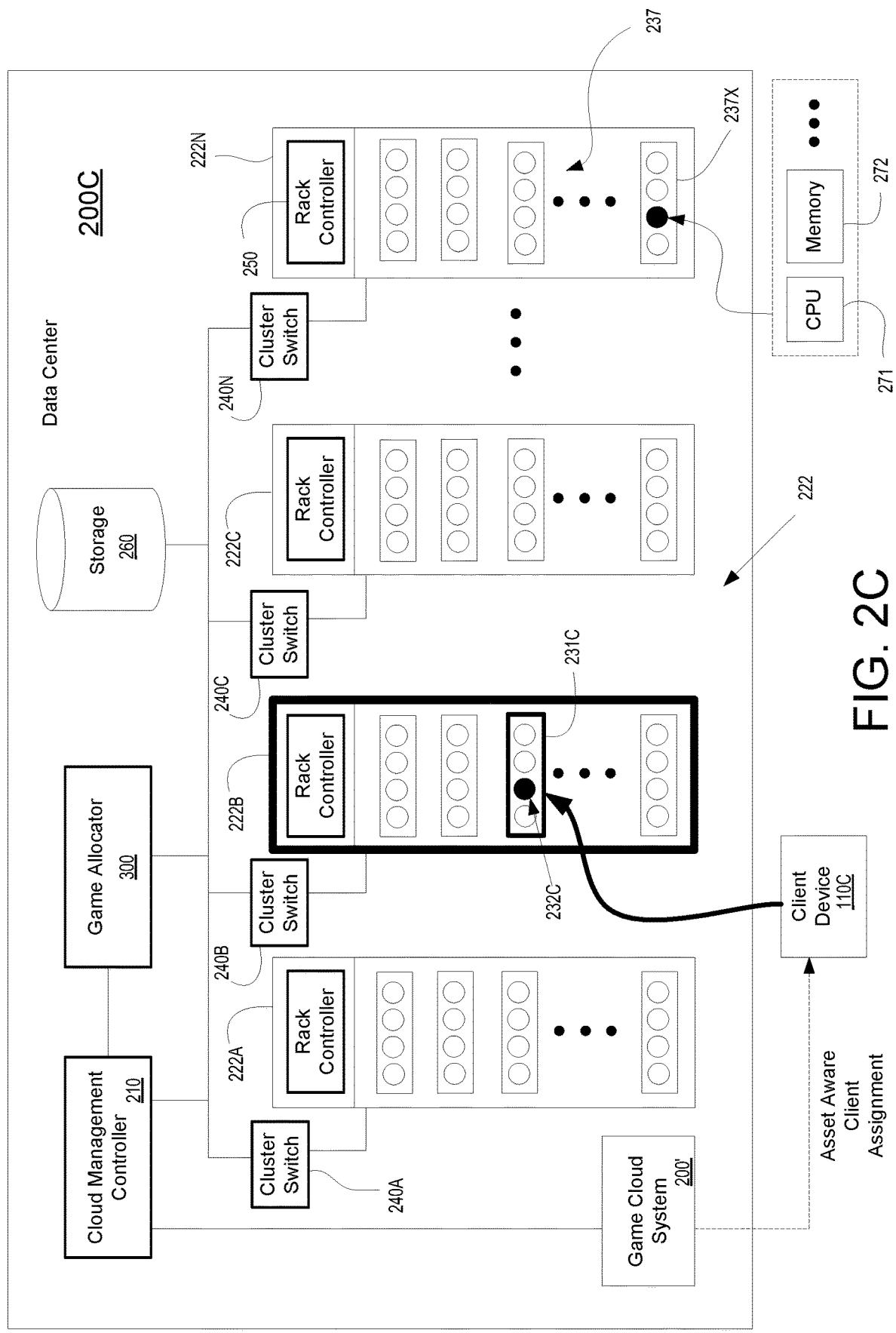
FIG. 2C is a diagram of a plurality of rack assemblies including a plurality of compute nodes configured for processing and storage, in accordance with one embodiment of the present disclosure.

FIG. 2C is a diagram of a data center 200C including a plurality of rack assemblies including a plurality of compute nodes configured for processing and storage, in accordance with one embodiment of the present disclosure. Data center 200C is similar to data centers 200A and 200B, wherein like numbered components have similar functionality. However, data center 200C has a different configuration of rack assemblies, such that a rack assembly is configured with stand-alone compute nodes each of which include dedicated storage (i.e., that do not rely on network storage).

In particular, data center 200C includes a plurality of rack assemblies 222 (e.g., rack assemblies 222A through 222N). Each of the rack assemblies includes a plurality of compute sleds 237, wherein each compute sled includes one or more compute nodes providing hardware resources. For example, compute sled 237X of rack assembly 222N is shown to include four compute nodes (including compute node 233), though it is understood that the rack assembly may include one or more compute nodes. Compute nodes may run gaming applications and stream the audio/video of a game session to one or more clients. More particularly, each compute node may be configured as a stand-alone system (e.g., gaming console, etc.) including a central processing unit (CPU), a graphics processing unit (GPU), volatile memory including random access memory (RAM) used during operation of the compute node (e.g., for quick access to frequently accessed data, programs, processes, etc.), non-volatile memory including local or system memory, etc. For purposes of illustration, compute node 233 of compute sled 237X of rack assembly 222N includes, in part, CPU 271 and system memory 272 (e.g., non-volatile memory), etc.

Each rack assembly is coupled to a cluster switch configured to provide communication with a cloud management controller 210 configured for management of the corresponding data center, as previously described. For example, rack assembly 222N is coupled to cluster switch 240N. The cluster switch also provides communication to other rack assemblies, (e.g., via corresponding cluster switches, and to external communication networks (e.g., internet, etc.).

As previously described, cloud management controller 210 of data center 200C communicates with assigner 191 to assign resources to client 110 in support of game cloud system 200' and/or 200. For example, client device 110C may be assigned to a particular compute node 232C of corresponding compute sled 231C of rack assembly 222B. Also, cloud management controller 210 and/or game allocator 300 are configured to collect and analyze data (e.g., internal and external data) in order to identify trends in popularity of video games for purpose of allocating video games across rack assemblies (e.g., to network storage, compute nodes, etc.) of data center(s) of a game cloud system to meet current and predicted demand for playing those video games. Artificial intelligence (e.g., AI layer within cloud management controller or game allocator) may be implemented to analyze the data to identify gaming trends for purposes of determining an appropriate allocation of video games to network storage and/or compute nodes of rack assemblies of data center(s) of a game cloud system. That is, AI is used to determine a popularity of a video game, and determine a number of rack assemblies and/or compute nodes for storing the video game based on the determined popularity.

FIG. 3 is an illustration of a system configured to implement an artificial intelligence model configured for allocation of video games throughout a game cloud system to meet current and future demands of users to play current and new video games, in accordance with one embodiment of the present disclosure. In embodiments of the present disclosure, trends identifying the popularity of video games can be classified using an AI model 160, and analyzed using an analyzer 140 in order to allocate video games to rack assemblies of a game cloud system that may be located at one or more data centers. For purposes of illustration, FIG. 3 is described within the context of a game allocator 300, although it is understood that the operations performed within the system of FIG. 3 can be performed by the cloud management system 210 and/or the game allocator 300 of FIGS. 1, 2A, and 2B.

In particular, the game allocator 300 is configured to provide appropriate allocation of video games throughout data centers (e.g., on network storage and/or compute nodes) of a game cloud system in order to meet current and predicted demand for video games of a gaming catalogue by users of a game cloud system, wherein a rack assembly may be configured with network storage for access by compute nodes, or may be configured with many individual computer and storage servers that do not rely on network storage. In some implementations, the distribution of video games across one or more data centers, and more specifically across rack assemblies of the game cloud system, is configured to allow the game cloud system to provide the most efficient use of resources and/or an optimum use of resources that ensures the quickest (e.g., real-time) access to video games requested by the users of the game cloud system.

In particular, the capture engine 340 of the game allocator 300 may be configured to capture game cloud network data, network data, and other data in order to provide input into the AI model 160 for classification trends in the popularity of video games. That is, capture engine 340 is configured to capture and/or receive as input any data that may be used to determine how to allocate video games across rack assemblies of the game cloud network. Selected portions of the captured data may be analyzed to determine the appropriate allocation of video games across rack assemblies of the game cloud system.

For example, capture engine 340 is configured to capture data related to services provided by the game cloud system 200 including one or more data centers, such as providing gaming sessions of video games to users. The data may include metrics defining video game usage (e.g., history of gaming sessions for one or more video games), system state of compute nodes in the game cloud system, the state of network storage including the storage of video games for each network storage of the rack assemblies of the data centers supporting the game cloud system. Still other data may be collected that is relevant for helping to determine the proper allocation of video games to network storage in order to meet current and predicted demand for video games (e.g., based on popularity trends for those video games). Further, the data center tracker 343 is configured to track the captured data from the game cloud system for purposes of determining an appropriate allocation of video games to meet current and predicted demand for those video games.

In addition, capture engine 340 is configured to collect telemetry data 315 from various sources 310*a-n*. As shown, streams of telemetry data 315 are captured. For example, telemetry data may include network data, such as social network platform data (e.g., Twitter, Facebook, etc.), social media data, web site data, media data, audio data, voice data, texting data, messaging data, other forms of digital data suitable for capture, and other data received over a network 150 (e.g., internet). For example, the network data may be captured through web scraping techniques used for automatically collecting publicly available information accessed through any communications network (e.g., internet). As an illustration, the captured network data may be formatted using text-based mark-up languages. In some implementations, web scraping techniques implement application programming interfaces (APIs) that are used to communicate with web sites and/or social network platform, or any service that is accessible through a network. In other implementations, the capture engine 340 is configured to capture non-digital data. For example, data may be parsed by machine and/or human, converted to digital format, and then input into the capture engine 340.

Relevant features from the captured data (e.g., telemetry data 315 and data 305 from the game cloud system) as identified by the feature extractor 345A are provided as input to the deep learning/machine learning engine 190. The feature extractor 345A is configured to parse through the captured data and identify and/or extract features from the data, wherein the features are relevant for use in the allocation of video games to network storage of a game cloud system. For example, features may include parameters, time, video game, game state, gaming sessions, wording, symbols, relevant information related to popularity of video games, etc. In another embodiment, the extraction of features may be performed by the deep/machine learning engine 190. In particular, the feature extractor 345B is configured to parse through the captured data and identify and/or extract features from the data. That is, the feature extractor 345B also has the capability to learn features that can be useful for the allocation of video games to network storage of a game cloud system.

As shown, the deep/machine learning engine 190 is configured for implementation to classify trends in the popularity of video games (e.g., implementation phase) based on the input set of data (e.g., extracted features), but may also be configured for training in another phase (e.g., training phase). In one embodiment, the AI model 160 is a machine learning model configured to apply machine learning to classify popularity trends of video games. In another embodiment, the AI learning model is a deep learning model configured to apply deep learning to classify popularity trends of video games, wherein machine learning is a sub-class of artificial intelligence, and deep learning is a sub-class of machine learning.

Purely for illustration, the deep/machine learning engine 190 may be configured as a neural network used to implement the AI model 160, in accordance with one embodiment of the disclosure. Generally, the neural network represents a network of interconnected nodes responding to input (e.g., extracted features) and generating an output (e.g., classification of trends indicating popularity of video games). In one implementation, the AI neural network includes a hierarchy of nodes. For example, there may be an input layer of nodes, an output layer of nodes, and intermediate or hidden layers of nodes. Input nodes are interconnected to hidden nodes in the hidden layers, and hidden nodes are interconnected to output nodes. Interconnections between nodes may have numerical weights that may be used link multiple nodes together between an input and output, such as when defining rules of the AI model 160.

In particular, the AI model 160 is configured to apply rules defining relationships between features and outputs (e.g., popularity of video games, trending popularity of video games, etc.), wherein features may be defined within one or more nodes that are located at one or more hierarchical levels of the AI model 160. The rules link features (as defined by the nodes) between the layers of the hierarchy, such that a given input set of data leads to a particular output (e.g., trend classification 350) of the AI model 160 (e.g., trend indicating current and/or predicted popularity of a video game). For example, a rule may link (e.g., using relationship parameters including weights) one or more features or nodes throughout the AI model 160 (e.g., in the hierarchical levels) between an input and an output, such that one or more features make a rule that is learned through training of the AI model 160. That is, each feature may be linked with one or more features at other layers, wherein one or more relationship parameters (e.g., weights) define interconnections between features at other layers of the AI model 160. As such, each rule or set of rules corresponds to a classified output. For example, the resulting output 350 according to the rules of the AI model 160 may predict a particular trend for a video game that indicates a current and/or predicted popularity for that video game).

As such, during the implementation phase, the AI model 160 is used to predict and/or classify trends in the popularity of one or more video games based on the configuration of the AI model 160. That is, for a given set of extracted features that is provided as input to the AI model 160, a trend classification 350 for a corresponding video game may be output by the AI model.

Further, the output (e.g., trend classification 350) from the AI model 160 may be used by the analyzer 140 to determine a course of action to be taken for the given set of input (e.g., extracted features). For example, the action may include a distribution pattern for allocating video games in a gaming catalogue to network storage of rack assemblies for one or more data centers of a game cloud system.

In particular, the analyzer 140 may include one or more functions performed on the trend classification 350 to spot, confirm, and/or predict trends in popularity on existing or new video games. In one implementation, the analyzer 140 is configured to perform trend analysis 361. The analysis may be performed to identify relevant information related to corresponding video games, such as when the video game was released, the game title, any franchise relationship, the developer, the types of users playing the video game, the loyalty of the users, how long gaming session last on average, demographics, etc. This information may be useful in determining an allocation of video games in a game cloud system to meet demand for the video game currently and in the near future (e.g., within the next 2-6 hours).

In addition, the analyzer 140 may be configured to perform trend prediction and/or matching 363. For example, the trend classification 350 for a video game may indicate a current popularity of the video game. Further analysis of the trend classification and/or other relevant data (e.g., information provided from performing trend analysis 361) may predict the longevity of the popularity, or predict whether the popularity will increase in the near or far future, or predict whether the popularity will decrease in the near or far future, or predict whether the popularity will remain stable in the near or far future. For example, if an important national event is scheduled for later that evening (e.g., sporting event, speech, etc.), it may be predicted that the popularity of a video game and other video games may decrease at least over the coming hours before the event as users quit their gaming sessions in order to participate in the national event (e.g., watch the sporting event, speech, etc.). In addition, the trend classification and other data for a first video game may closely mirror a trend classification and other data for a second video game. As such, the predicted popularity over time for the first video game may be inferred and/or closely aligned with the actual popularity over time for the second video game. All of this information may be useful in determining an allocation of video games in a game cloud system to meet demand for the video game currently and in the near future (e.g., within the next 2-6 hours) or far future (e.g., within the coming days or weeks or months, etc.).

Further, the analyzer 140 may be configured to perform historical trend analysis 365. For example, historical trend analysis may be used to predict future video game usage based on historical patterns of use. In that case, the popularity of a new release of a later version of a video game may follow or be closely aligned with the actual popularity of a previous version of the video game. For instance, in a highly popular video game franchise, the popularity of later releases will match or gain in popularity over previous releases. This information may be useful in determining an allocation of that video game throughout game cloud system to meet demand for the video game currently and in the near future (e.g., within the next 2-6 hours) or far future (e.g., within the coming days or weeks or months, etc.).

Also analyzer 140 may be configured to perform additional responses (e.g., actions) with the action generator 370. In particular, the analyzer 140 may be configured to perform pattern generation 367 in order to determine a distribution pattern for allocating video games in a game cloud system. For example, the analyzer may determine the allocation pattern based on one or more of the trend classification 350, information obtained from trend analysis 361, information obtained from trend predictions and/or matching 363, and information obtained from historical trend analysis 365.

In one embodiment, the action generator 370 includes a rack distributor 373 that is configured for allocating video games to allocate video games to network storage of rack assemblies of one or more data centers of the game cloud system. That is, based on the pattern determined by the pattern generation 367, the cloud management controller may send instructions for loading a corresponding video game to network storage of one or more corresponding rack assemblies, wherein the rack assemblies may be located in one or more data centers of the game cloud system. As such, based on the trend indicating current and/or popularity of a corresponding video game, the distribution of that video game may be allocated to meet current and/or anticipated demand for playing that video game. This video game allocation may be performed for each video game that has a corresponding trend classification being output from the AI model 160.

In another embodiment, the action generator 370 includes a video game node pre-loader 375 that is configured for loading a corresponding video game onto one or more compute nodes so that the compute node can be readily assigned to any new user requesting to play that video game. The pre-loading of the video game to a node is performed based on the trend classification indicating current and/or predicted popularity of the video game, which may correspond to current and/or predicted demand to play that video game by users. By pre-loading a video game to a compute node, a new user does not have to wait for the video game to be loaded to the compute node assigned to that user. As video games have become more complex, this load time may be significant (e.g., over 10 or 20 minutes) in order to download all the necessary packages for that video game to the compute node. In that manner, the pre-load allows the user to immediately play the video game without waiting for the game to load.

With the detailed description of the various modules of the system 100, data centers 200A and 200B, and the game allocator 300 of FIGS. 1, 2A, 2B, and 3, flow diagram 400 discloses a method for allocating video games throughout a game cloud system to meet current and future demands of users to play current and new video games, in accordance with one embodiment of the present disclosure. In particular, flow diagram 400 may be implemented to provide for an appropriate allocation of video games throughout data centers (e.g., on network storage) of a game cloud system based on popularity of video games. For example, video game popularity may be determined by monitoring video game usage, system state of compute nodes in the game cloud system, predicting current future video game usage based on historical patterns of use, and using artificial intelligence to analyze data captured from the game cloud system and network data (e.g., scraping data from social media, websites, various forms of media, etc.) to spot and/or predict trends in popularity on existing or new video games. Flow diagram 400 may be implemented within a back-end server (e.g., within the game cloud system 200 in a cloud management controller 210 and/or game allocator 300 in combination with a deep and/or machine learning engine 190), previously described.

At 410, the method includes tracking state of a plurality of compute nodes of a data center, including the monitoring of the compute nodes. The compute nodes are distributed across a plurality of rack assemblies, wherein the rack assemblies may be configured within one or more data centers of a game cloud system providing access to video games of a video game catalogue. For example, the game cloud system may be configured to execute video games on compute nodes to provide gaming sessions to users playing those video games.

In one embodiment, the tracking includes tracking usage (e.g., active or inactive) of each of the plurality of compute nodes. For example, information may include whether a corresponding compute node is active or inactive, whether a video game is loaded onto the corresponding compute node, whether a gaming session is actively being executed to support a gaming session with a user assigned to the corresponding compute node. In addition, the tracking includes tracking inventory of the cloud gaming servers or compute nodes, including the number of compute nodes in the game cloud system, the number of active compute nodes that are actively supporting gaming session, the number of available compute nodes that are available for assignment to new users requesting to play a corresponding video game. The tracking may include tracking current and/or historical (e.g., past) usage of the compute nodes.

Also, the tracking may include tracking a distribution of video games of a catalogue of video games across a plurality of network storage of rack assemblies in one or more rack assemblies of the game cloud system. Because network storage is limited, each network storage (e.g., of a corresponding rack assembly) may not be able to store the complete catalogue of video games, especially if fast access of network storage is emphasized (i.e., fast storage requires an increase in the cost of network storage, which may limit the size of the network storage). Also, not every video game in a catalogue of video games may be loaded onto network storage. For example, an older video game may see low demand for gaming sessions, and at a particular moment in time may not see any demand such that no storage servers have the video game loaded, or a minimum number of storage servers (e.g., 1-3) have the video game loaded. On the other hand, a very popular video game in the catalogue of video games may be loaded onto each network storage in the one or more data centers of the game cloud system.

At 420, the method including tracking popularity of the plurality of video games in a catalogue of video games supported by a game cloud system. More particularly, a popularity valuation may be tracked, wherein the valuation indicates a degree of popularity for a corresponding video game. In some implementations, the popularity valuation for a video game may correspond to a demand for gaming sessions by users requesting to play the video game. That is, as a popularity valuation increases (i.e., indicating increasing popularity of the video game), there is a corresponding increase in gaming sessions requested by users of the game cloud system. In one embodiment, the popularity valuation is tracked by tracking gaming sessions of a corresponding video game within the game cloud system to determine current and/or predicted popularity, wherein gaming sessions are handled by corresponding compute nodes of the game cloud system.

In other embodiments, as previously described, tracking of popularity may include the collection and/or tracking of information obtained from the game cloud system (e.g., gaming sessions) and/or network data, including data captured from social network platforms, web sites, media sites, media outlets, etc. Other non-digital forms of data may be captured and/or tracked.

In some embodiments, the tracking of popularity includes determining a trend indicating current and/or predicted popularity of a video games. For purposes of illustration, based on the information that is captured and/or tracked (e.g., tracking one or more gaming sessions of a video game across compute nodes of one or more data centers of a game cloud system), a trend may be determined that indicates a popularity (e.g., current or predicted popularity in the near or far future). In one embodiment, the trend may correspond to a popularity valuation for the video game. For example, a trend may show an increase in a popularity valuation of a video game. The trend may be determined based on one or more gaming sessions of the video game that is tracked, wherein the popularity valuation may correspond to an increase in demand for gaming sessions for that video game. The trend may also be determined based on other information that is captured and tracked, as previously described. Also, a trend may show a decrease in a popularity valuation of a video game, which may correspond to a decrease in demand for gaming sessions for that video game.

In some embodiments of the present disclosure, artificial intelligence is implemented to track and/or determine popularity of video games within a gaming catalogue. Based on the determined popularity, rules and/or further application of AI may be implemented to determine and/or schedule an optimal distribution of video games across the rack assemblies (e.g., in corresponding network storage) of one or more data centers of a game cloud system in order to meet current and/or predicated demand for those video games.

As previously described, AI may be used to determine and/or track popularity of video games in a catalogue of video games supported by a game cloud system. For example, a game allocator 300 and/or a cloud management system 210 may be configured to determine and/or track the popularity of video games using AI. The results may be used to take further action (e.g., as determined through rules or additional application of AI) to schedule an optimal distribution of video games across the rack assemblies of one or more data centers of a game cloud system based on the popularity of those video games. For example, a popular video game may see an increase in the number of rack assemblies that load that video game for access by compute nodes supporting gaming sessions of that video game. On the other hand, a video game becoming less popular may see a decrease in the number of rack assemblies that load that video game.

In particular, data from the game cloud system (e.g., gaming sessions of video games) and/or telemetry data captured over a network (e.g., data scraped from a plurality of sites, social network platforms, etc. that are accessible through one or more networks (e.g., using an API) may be captured and parsed to extract relevant features. Those features are input into a deep learning and/or machine learning engine implementing an AI model that is configured to classify a trend in popularity for a corresponding video game, and for each video game in a catalogue of video games supported by a corresponding game cloud system. That is, the AI model is configured to classify a trend of a video game based on the features (e.g., the AI model provides the trend as an output). The trend may indicate a current and/or predicated popularity of the video game. More particularly, the trend indicates a popularity valuation for the video game. For example, the trend may indicate that a popularity (and corresponding popularity valuation) of a video game is increasing, such that the popularity valuation corresponds to an increasing demand for gaming sessions for the video game in the game cloud system. Also, a trend may indicate that a popularity (and corresponding popularity valuation) of a video game is decreasing, such that the popularity valuation corresponds to a decreasing demand for gaming sessions for the video game in the game cloud system.

At 430, the method includes determining a distribution of one or more video games from the plurality of video games across the plurality of rack assemblies based on the plurality of popularity valuations of the plurality of video games. In particular, the allocation of video games to network storage of rack assemblies in one or more data centers of a game cloud system is performed to meet current and predicted user demand for one or more video games based on the determined trends indicating popularity of those video games. For example, for a corresponding video game, based on the determined trend (e.g., determined through AI) the allocation may indicate an increase in the number of network storage servers and corresponding rack assemblies configured to load and/or store that video game when the trend indicates an increase in popularity, or the allocation may indicate a decrease in the number of network storage servers and corresponding rack assemblies configured to load and/or store that video game when the trend indicates a decrease in popularity.

As a result, the distribution pattern indicating an allocation of video games to network storage of a game cloud system may instruct that each rack assembly in one or more data centers should be loaded with a video game that is most popular (e.g., the hottest video game currently), and that only one or two rack assemblies should be loaded with a video game that is less popular (e.g., an older video game). As previously described, the entire catalogue of video games is stored on distributed storage that is separate from the network storage of the rack assemblies. Still other video games may be loaded onto a selected and/or determined number of rack assemblies based on their popularity valuations. As such, video games that are in demand or anticipated to be in demand will be loaded onto network storage, whereas the remaining video games are stored in the distributed storage for downloading to network storage when demand for those video game increase.

At 440, the method including storing the one or more video games from the plurality of video games in the game catalogue across the plurality of rack assemblies based on the distribution of the one or more video game that is determined. In that manner, the proper allocation of video games ensures that current and future demand for gaming sessions of current and/or new video games can be supported by the game cloud system. For example, proper allocation of a popular video game ensures that every user requesting that video game will be assigned to a compute node executing a gaming session for that video game. Also, the proper allocation of a less popular video game prevents over allocation of resources to that video game while also ensuring that users requesting that video game can be assigned to compute nodes executing gaming sessions established for that video game. In that manner, by not over provisioning the less popular video game computing resources (e.g., network storage) may remain available to handle other more popular video games.

In one embodiment, the classified and/or identified trend and subsequent video game allocation is performed to ensure that if an obscure video game title suddenly goes viral (i.e., becomes increasingly popular in a very short period of time), additional rack assemblies in the data center are loaded with that video game title in order to meet a huge surge in demand by users to play that video game title. This may require that some video games are deemphasized by removing them from rack assemblies, such that the number of rack assemblies supporting a corresponding deemphasized video game may be reduced. The recovered space in network storage may be used to load the video game that is predicted to go viral or identified as going viral.

In another implementation, artificial intelligence may be implemented to predict an increase in demand for the video game. For example, active gaming sessions of a video game may be tracked across a plurality of compute nodes of a game cloud system to determine a trend indicating popularity in the video game. The trend may also predict a future period of time with a high demand for gaming sessions for the video game. In that manner, the video game may be loaded across an increasing number of rack assemblies to support the high demand by users wanting to play the video game.

In another implementation, popularity of a video game may be determined and/or matched to a popularity of related video game. That is, demand for a second video game may be inferred from demand of a first video game. For example, the second video game may be a newer version of a video game franchise. The second video game (new release) is anticipated to perform (e.g., be as popular) just as well if not better than the last released or first video game within the franchise based on tracking previous popularity. More particularly, a first history of a first popularity valuation for the first video game is tracked across a plurality of compute nodes in the data center for at least a portion of a life of the first video game. A first trend is determined for that first video game, wherein the first trend may indicate that a first popularity valuation of the first video game is increasing over a first period of time in the portion of the life of the first video game. A first number of rack assemblies can be previously or newly determined, and configured for storing the first video game based on the first trend, as is shown in the first history. Thereafter, it may be determined that a second trend indicating that a second popularity valuation of the second video game over a second period of time will be similar to the first trend of the first video game. For example, the two trends may have matching parameters implemented through the AI model, or the first and second video games may be part of a video game franchise in which it may be inferred to subsequent releases will be as popular if not more so than previous releases. In that manner, an appropriate number of rack assemblies (e.g., a second number of rack assemblies) for storing the second video game may be determined based on the second trend, wherein the second number of rack assemblies is approximately similar to the first number used to support gaming sessions of the first video game.

In still another embodiment, AI is implemented to identify a trend that indicates a popularity valuation for a video game is increasing based on capturing and tracking of game cloud data and/or network data, etc., wherein the trend may be determined through AI or implementation of rules. In order to meet user demand and provide users with real-time access to the video game (i.e., playing the video game immediately or shortly after requesting a gaming session of the video game), the video game may be loaded onto a network storage of a rack assembly (i.e., to give ready access to the video game to compute nodes of that rack assembly), and may also be pre-loaded onto a compute node of the rack assembly. In that manner, a user requesting a gaming session may be immediately assigned to the compute node that has the video game pre-loaded. As such, the user need not wait for a load time in which the video game has to be loaded from network storage to the compute node, which may take several minutes or longer. It is understood that the video game may be pre-loaded onto one more compute nodes of the rack assembly, and also may be loaded to network storage of multiple rack assemblies and subsequently pre-loaded to multiple compute nodes of the multiple rack assemblies in order to meet anticipated demand for the video game.

Figure 5:
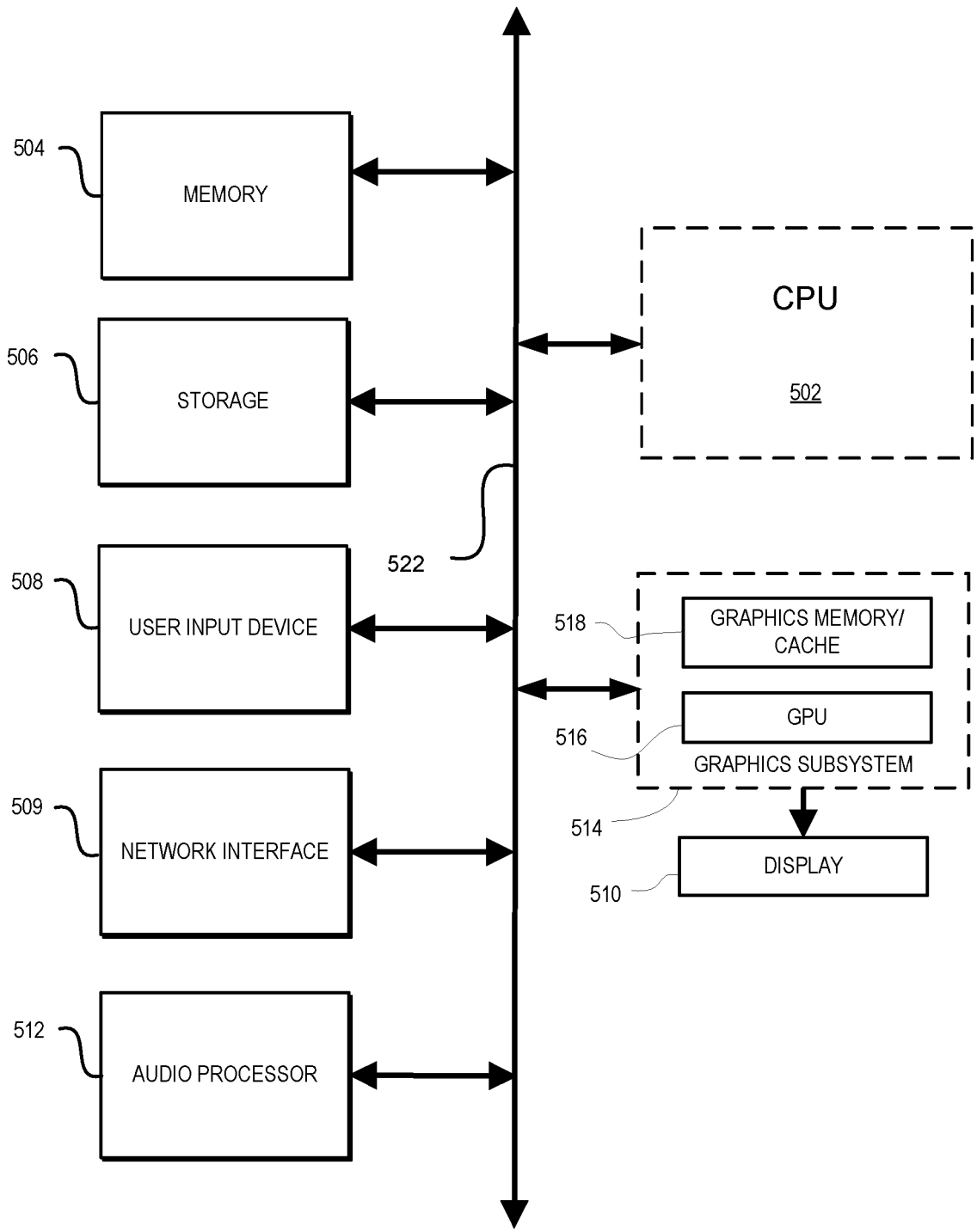
FIG. 5 illustrates components of an example device that can be used to perform aspects of the various embodiments of the present disclosure.

FIG. 5 illustrates components of an example device 500 that can be used to perform aspects of the various embodiments of the present disclosure. For example, FIG. 5 illustrates an exemplary hardware system suitable for providing allocation of video games throughout data centers of a game cloud system to meet current and future demands of users to play current and new video games, in accordance with embodiments of the present disclosure. This block diagram illustrates a device 500 that can incorporate or can be a personal computer, a server computer, gaming console, mobile device, or other digital device, each of which is suitable for practicing an embodiment of the invention. Device 500 includes a central processing unit (CPU) 502 for running software applications and optionally an operating system. CPU 502 may be comprised of one or more homogeneous or heterogeneous processing cores.

In accordance with various embodiments, CPU 502 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for graphics processing during execution of a game.

Memory 504 stores applications and data for use by the CPU 502 and GPU 516. Storage 506 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 508 communicate user inputs from one or more users to device 500, examples of which may include keyboards, mice, joysticks, touch pads, touch screens, still or video recorders/cameras, and/or microphones. Network interface 509 allows device 500 to communicate with other computer systems via an electronic communications network, and may include wired or wireless communication over local area networks and wide area networks such as the internet. An audio processor 512 is adapted to generate analog or digital audio output from instructions and/or data provided by the CPU 502, memory 504, and/or storage 506. The components of device 500, including CPU 502, graphics subsystem including GPU 516, memory 504, data storage 506, user input devices 508, network interface 509, and audio processor 512 are connected via one or more data buses 522.

A graphics subsystem 514 is further connected with data bus 522 and the components of the device 500. The graphics subsystem 514 includes at least one graphics processing unit (GPU) 516 and graphics memory 518. Graphics memory 518 includes a display memory (e.g. a frame buffer) used for storing pixel data for each pixel of an output image. Graphics memory 518 can be integrated in the same device as GPU 516, connected as a separate device with GPU 516, and/or implemented within memory 504. Pixel data can be provided to graphics memory 518 directly from the CPU 502. Alternatively, CPU 502 provides the GPU 516 with data and/or instructions defining the desired output images, from which the GPU 516 generates the pixel data of one or more output images. The data and/or instructions defining the desired output images can be stored in memory 504 and/or graphics memory 518. In an embodiment, the GPU 516 includes 3D rendering capabilities for generating pixel data for output images from instructions and data defining the geometry, lighting, shading, texturing, motion, and/or camera parameters for a scene. The GPU 516 can further include one or more programmable execution units capable of executing shader programs.

The graphics subsystem 514 periodically outputs pixel data for an image from graphics memory 518 to be displayed on display device 510, or to be projected by a projection system (not shown). Display device 510 can be any device capable of displaying visual information in response to a signal from the device 500, including CRT, LCD, plasma, and OLED displays. Device 500 can provide the display device 510 with an analog or digital signal, for example.

In other embodiments, the graphics subsystem 514 includes multiple GPU devices, which are combined to perform graphics processing for a single application that is executing on a corresponding CPU. For example, the multiple GPUs can perform multi-GPU rendering of geometry for an application by pretesting the geometry against screen regions, which may be interleaved, before rendering objects for an image frame. In other examples, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g. if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g. a first shader operation) and compositing of outputs from slave GPU 2 and slave GPU 3, wherein slave GPU 2 could perform a second shader (e.g. fluid effects, such as a river) operation, the slave GPU 3 could perform a third shader (e.g. particle smoke) operation, wherein master GPU 1 composites the results from each of GPU 1, GPU 2, and GPU 3. In that manner, different GPUs can be assigned to perform different shader operations (e.g. flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

Accordingly, the present disclosure describes methods and systems configured for allocating video games throughout a game cloud system to meet current and future demands of users to play current and new video games.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method, comprising:
    tracking state of a plurality of compute nodes of a data center, wherein the plurality of compute nodes is distributed across a plurality of rack assemblies;
    tracking a plurality of popularity valuations of a plurality of video games based on network data collected externally from the data center, wherein each of the plurality of popularity valuations that is tracked indicates a level of interest of a general population for a corresponding video game, wherein the network data includes social network platform data accessed using at least one application programming interface;
    determining a distribution of one or more video games from the plurality of video games across the plurality of rack assemblies based on the plurality of popularity valuations of the plurality of video games; and
    storing the one or more video games from the plurality of video games across the plurality of rack assemblies based on the distribution of the one or more video games that are determined,
    wherein the tracking the plurality of popularity valuations includes:
        receiving telemetry data from a plurality of sites accessible through one or more networks;
        extracting a plurality of features from the telemetry data;
        classifying a trend of a video game based on the plurality of features, wherein the trend indicates a popularity valuation for the video game that is increasing, wherein the popularity valuation corresponds to a demand for a plurality of gaming sessions for the video game; and
        increasing a number of rack assemblies of the plurality of rack assemblies for storing the video game based on the trend.

2. The method of claim 1, wherein the tracking the state of the plurality of compute nodes includes:
    tracking usage of each of the plurality of compute nodes; and
    tracking a distribution of the plurality of video games across a plurality of network storage of the plurality of rack assemblies.

3. The method of claim 1, further comprising:
    using artificial intelligence to determine the trend associated with the popularity valuation of the video game; and
    determining the number of rack assemblies for storing the video game based on the trend.

4. The method of claim 1, wherein the tracking the plurality of population valuations includes:
    tracking one or more gaming sessions of each of the plurality of video games across the plurality of compute nodes in the data center.

5. The method of claim 4, further comprising:
    tracking one or more gaming sessions of the video game across the plurality of compute nodes in the data center; and
    identifying the trend based on the one or more gaming sessions of the video game that is tracked indicating that the popularity valuation for the video game is increasing based on the one or more gaming sessions of the video game that is tracked, wherein the popularity valuation corresponds to the demand for the plurality of gaming sessions for the video game.

6. The method of claim 4, further comprising:
tracking a plurality of gaming sessions of the video game across the plurality of compute nodes in the data center;
predicting a period with a high demand for the plurality of gaming sessions for the video game; and
loading during the period the video game across the number of rack assemblies of the plurality of rack assemblies for supporting the high demand.

7. The method of claim 1, further comprising:
tracking a first history of a first popularity valuation of a first video game across the plurality of compute nodes in the data center for a portion of a life of the first video game;
determining a first trend in the first history indicating that the first popularity valuation of the first video game is increasing over a first period of time in the portion of the life of the first video game;
determining a first number of rack assemblies for storing the first video game based on the first trend;
predicting a second trend indicating that a second popularity valuation of a second video game over a second period of time will be similar to the first trend of the first video game; and
loading a second number of rack assemblies for storing the second video game based on the second trend, wherein the second number of rack assemblies is approximately similar to the first number of rack assemblies.

8. The method of claim 1, further comprising:
identifying the trend indicating that the popularity valuation for the video game is increasing based on the tracking of the plurality of popularity valuations of the plurality of video games; and
pre-loading the video game to one or more compute nodes of the plurality of compute nodes for new gaming sessions based on the trend.

9. A non-transitory computer-readable medium storing a computer program for performing a method, the computer-readable medium comprising:
program instructions for tracking state of a plurality of compute nodes of a data center, wherein the plurality of compute nodes is distributed across a plurality of rack assemblies;
program instructions for tracking a plurality of popularity valuations of a plurality of video games based on network data collected externally from the data center, wherein each of the plurality of popularity valuations that is tracked indicates a level of interest of a general population for a corresponding video game, wherein the network data includes social network platform data accessed using at least one application programming interface;
program instructions for determining a distribution of one or more video games from the plurality of video games across the plurality of rack assemblies based on the plurality of popularity valuations of the plurality of video games; and
program instructions for storing the one or more video games from the plurality of video games across the plurality of rack assemblies based on the distribution of the one or more video games that are determined,
wherein the program instructions for tracking a plurality of popularity valuations includes:

program instructions for receiving telemetry data from a plurality of sites accessible through one or more networks;
program instructions for extracting a plurality of features from the telemetry data;
program instructions for classifying a trend of a video game based on the plurality of features, wherein the trend indicates a popularity valuation for the video game that is increasing, wherein the popularity valuation corresponds to a demand for a plurality of gaming sessions for the video game; and
program instructions for increasing a number of rack assemblies of the plurality of rack assemblies for storing the video game based on the trend.

10. The non-transitory computer-readable medium of claim 9, wherein the program instructions for tracking the state of the plurality of compute nodes includes:
program instructions for tracking usage of each of the plurality of compute nodes; and
program instructions for tracking a distribution of the plurality of video games across a plurality of network storage of the plurality of rack assemblies.

11. The non-transitory computer-readable medium of claim 9, further comprising:
program instructions for using artificial intelligence to determine the trend associated with the popularity valuation of the video game; and
program instructions for determining the number of rack assemblies for storing the video game based on the trend.

12. The non-transitory computer-readable medium of claim 9, further comprising:
program instructions for tracking one or more gaming sessions of the video game across the plurality of compute nodes in the data center; and
program instructions for identifying the trend based on the one or more gaming sessions of the video game that is tracked indicating that the popularity valuation for the video game is increasing based on the one or more gaming sessions of the video game that is tracked, wherein the popularity valuation corresponds to the demand for the plurality of gaming sessions for the video game.

13. The non-transitory computer-readable medium of claim 9, further comprising:
program instructions for tracking a first history of a first popularity valuation of a first video game across the plurality of compute nodes in the data center for a portion of a life of the first video game;
program instructions for determining a first trend in the first history indicating that the first popularity valuation of the first video game is increasing over a first period of time in the portion of the life of the first video game;
program instructions for determining a first number of rack assemblies for storing the first video game based on the first trend;
program instructions for predicting a second trend indicating that a second popularity valuation of a second video game over a second period of time will be similar to the first trend of the first video game; and
program instructions for loading a second number of rack assemblies for storing the second video game based on the second trend, wherein the second number of rack assemblies is approximately similar to the first number of rack assemblies.

14. A computer system comprising:
a processor;

memory coupled to the processor and having stored therein instructions that, if executed by the computer system, cause the computer system to execute a method comprising:
- tracking state of a plurality of compute nodes of a data center, wherein the plurality of compute nodes is distributed across a plurality of rack assemblies;
- tracking a plurality of popularity valuations of a plurality of video games based on network data collected externally from the data center, wherein each of the plurality of popularity valuations that is tracked indicates a level of interest of a general population for a corresponding video game, wherein the network data includes social network platform data accessed using at least one application programming interface;
- determining a distribution of one or more video games from the plurality of video games across the plurality of rack assemblies based on the plurality of popularity valuations of the plurality of video games; and
- storing the one or more video games from the plurality of video games across the plurality of rack assemblies based on the distribution of the one or more video games that are determined,
- wherein the tracking a plurality of popularity valuations includes:
  - receiving telemetry data from a plurality of sites accessible through one or more networks;
  - extracting a plurality of features from the telemetry data;
  - classifying a trend of a video game based on the plurality of features, wherein the trend indicates a popularity valuation for the video game that is increasing, wherein the popularity valuation corresponds to a demand for a plurality of gaming sessions for the video game; and
  - increasing a number of rack assemblies of the plurality of rack assemblies for storing the video game based on the trend.

15. The computer system of claim 14, wherein in the method the tracking the state of the plurality of compute nodes includes:
- tracking usage of each of the plurality of compute nodes; and
- tracking a distribution of the plurality of video games across a plurality of network storage of the plurality of rack assemblies.

16. The computer system of claim 14, the method including:
- tracking one or more gaming sessions of the video game across the plurality of compute nodes in the data center; and
- identifying the trend based on the one or more gaming sessions of the video game that is tracked indicating that the popularity valuation for the video game is increasing based on the one or more gaming sessions of the video game that is tracked, wherein the popularity valuation corresponds to the demand for the plurality of gaming sessions for the video game.

17. The computer system of claim 1, the method including:
- identifying the trend indicating that the popularity valuation for the video game is increasing based on the tracking of the plurality of popularity valuations of the plurality of video games; and
- pre-loading the video game to one or more compute nodes of the plurality of compute nodes for new gaming sessions based on the trend.

* * * * *